United States Patent [19]

Fujisawa et al.

[11] Patent Number: 4,802,698

[45] Date of Patent: Feb. 7, 1989

[54] JOINT MEANS HAVING FLANGES

[75] Inventors: Katsuhide Fujisawa; Toshimasa Takanaka; Hiroo Buseki; Masakatsu Takahashi, all of Kanagawa, Japan

[73] Assignee: Nippon Reinz Co., Ltd., Kanagawa, Japan

[21] Appl. No.: 35,937

[22] Filed: Apr. 8, 1987

[30] Foreign Application Priority Data

Apr. 22, 1986 [JP] Japan .............................. 61-59617[U]
Apr. 22, 1986 [JP] Japan .............................. 61-59618[U]
Apr. 23, 1986 [JP] Japan .............................. 61-60182[U]

[51] Int. Cl.$^4$ .............................................. F16L 23/00
[52] U.S. Cl. ................................... 285/363; 285/910; 277/228; 277/235 R
[58] Field of Search ............... 285/363, 918, 910, 368; 277/228, 229, 235 R

[56] References Cited

U.S. PATENT DOCUMENTS

| | | |
|---|---|---|
| 956,188 | 4/1910 | Schultheis ........................ 277/228 |
| 1,213,132 | 1/1917 | Peterson ........................ 285/363 X |
| 2,165,296 | 7/1939 | Oass ........................... 277/228 X |
| 2,967,805 | 1/1961 | Forestek ........................ 277/228 X |
| 3,199,528 | 8/1965 | Oetjens ........................ 285/363 X |
| 4,182,121 | 1/1980 | Hall . |
| 4,289,169 | 9/1981 | Banholzer . |
| 4,548,415 | 10/1985 | Bendl . |

FOREIGN PATENT DOCUMENTS

| | | |
|---|---|---|
| 2810584 | 9/1979 | Fed. Rep. of Germany . |
| 1372210 | 8/1964 | France ........................... 285/918 |
| 2428780 | 1/1980 | France . |
| 5800 | 1/1973 | Japan . |
| 25536 | 6/1977 | Japan . |
| 101962 | 1/1978 | Japan . |
| 1325023 | 8/1973 | United Kingdom . |

Primary Examiner—Thomas F. Callaghan
Attorney, Agent, or Firm—Wenderoth, Lind & Ponack

[57] ABSTRACT

A joint has a first flange rigidly secured to the outer peripheral surface of an end portion of a first pipe and a second flange rigidly secured to the outer peripheral surface of an end portion of a second pipe. The first and second flanges are aligned with each other and joined together by nuts and bolts so that the first and second pipes are connected together and maintained in a hermetically sealed state by a closed loop-shaped sealing member clamped between the first and second flanges. The sealing member is fitted on the end portion of the second pipe which slightly projects from the second flange. The sealing member is formed by wrapping a thin metal sheet around heat resistant material and has an inner diameter which is equal to or slightly larger than the outer diameter of the second pipe. A frusto-conical surface aligned with the sealing member defines a portion of the inner peripheral surface of the first flange.

4 Claims, 2 Drawing Sheets

JOINT MEANS HAVING FLANGES

BACKGROUND OF THE INVENTION

1. Field of the Invention:

The present invention relates to a joint means having flanges. More particularly, the present invention pertains to an improvement in a joint means in which a closed loopshaped sealing member which is interposed between two flanges is formed by wrapping a thin metal sheet around heat resistant material.

2. Description of the Related Art:

In general, the exhaust gas discharged from various kinds of exhaust gas generating sources, for example, automotive engines, is emitted into the atmosphere through a relatively long exhaust pipe connected at one end thereof to the exhaust manifold of the engine.

It is a general practice to provide a muffler and a catalytic converter at an intermediate portion of such an exhaust pipe in order to damp noise associated with the exhaust gas and to render harmless certain noxious components contained therein.

Associated parts such as the muffler and the catalytic converter are produced separately from the exhaust pipe and are joined to the intermediate portion of the pipe using a joint means. This joint means must be airtight so that no exhaust gas leaks from the exhaust pipe. Accordingly, two pipe end portions which constitute a joint means have respective flanges which extend outwardly. These flanges are fastened to each other by means of bolts with a sealing member interposed between the flanges. Since the temperature of exhaust gas is relatively high, it is a general practice to employ a sealing member having high heat resistance and relatively high rigidity. Since a sealing member having a relatively high rigidity contacts the surface of a flange in a state close to line contact, it is necessary, in order to obtain satisfactory exhaust sealing performance, to precisely machine the flange surface which is to be contacted by the sealing member so that said surface has a high degree of accuracy in terms of surface roughness and flatness. Thus, the conventional method of making a joint means involves a difficult process for machining the flanges. In addition, at least one of the two flanges needs to have a groove formed therein for positioning the sealing member, and it is particularly difficult to finish this groove with a high degree of accuracy.

SUMMARY OF THE INVENTION

In view of the above-described circumstances, it is an object of the present invention to reduce the number of portions of the flanges of a joint means which need to be machined with a high degree of accuracy.

It is another object of the present invention to provide a joint means which excels in sealing performance relative to the prior art.

According to the present invention, a flange is joined to a pipe at such a position that the end portion of the pipe projects from the flange. A closed loop-shaped sealing member which is formed by wrapping a thin metal sheet around heat resistant material is disposed around the end portion of this pipe. The inner diameter of this sealing member is equal to or slightly larger than the outer diameter of the pipe. Another flange which is joined to another pipe has a tapered surface extending along its inner peripheral edge, so that, when these two flanges are fastened to each other, the tapered surface presses the sealing member against the first flange and the outer peripheral surface of the first pipe.

In regard to the combination of the first pipe and the first flange, the sealing member is in contact with two portions, that is, the flat surface of the flange and the outer peripheral surface of the pipe. It is, therefore, possible to achieve effective sealing without needing to machine these surfaces with a high degree of accuracy. As to the second flange, machining of its inner peripheral edge to form the tapered surface is easier than machining the flange to form a groove.

BRIEF DESCRIPTION OF THE DRAWINGS

The above and other objects, features and advantages of the present invention will become clear from the following description of the preferred embodiments thereof, taken in conjunction with the accompanying drawings, in which.

DETAILED DESCRIPTION OF THE PREFERRED EMBODIMENTS

Figure 1:
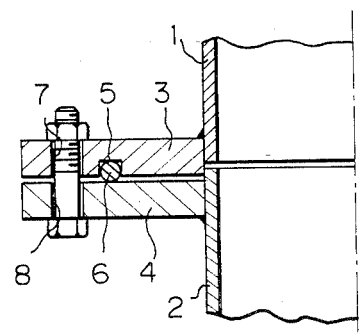
FIG. 1 is a sectional view of a conventional joint means.

Referring first to FIG. 1, which is a sectional view of a conventional joint means shown for comparative purposes in order to make clear the feature of the present invention, the joint means is arranged to connect first and second pipes 1 and 2. A first flange 3 is rigidly secured to the outer peripheral surface of the end portion of the first pipe 1, and a second flange 4 is similarly secured to the outer peripheral surface of the end portion of the second pipe 2. A closed loop-shaped groove 5 is formed in the surface of the first flange 3 which faces the second flange 4, and a sealing member 6 is disposed in the groove 5 in such a manner that a part of the sealing member 6 projects from the groove 5. In this state, after the first and second flanges 3 and 4 have been properly aligned with each other, bolts are inserted through circular bores 7 and 8 which are respectively provided in the first and second flanges 3 and 4. Nuts are then screwed onto the bolts and tightened to join the first and second flanges 3 and 4 together, thus connecting the first and second pipes 1 and 2 together in a hermetically sealed state.

With this arrangement, the sealing member 6 is in contact with the surface of the flange 4 at one portion thereof. In the groove 5, the sealing member 6 is in contact with the side walls thereof in addition to the bottom wall. However, the function of the side walls of the groove 5 is to position the sealing member 6, and the effective contact of the sealing member 6 with the grooves occurs at one portion of the member 6 which is in contact with the bottom surface of the groove 5. Whe the sealing member 6 is made from a material having a relatively high rigidity, it is necessary, in order to prevent sealing failure, to machine the surface of the flange which is in contact with the sealing member 6 so that the machined surface has considerably good surface roughness and flatness. It is difficult to effect such machining with high precision (particularly at the bottom surface of the groove 5), and this leads to an increase in the production cost of the joint means.

Figure 2:
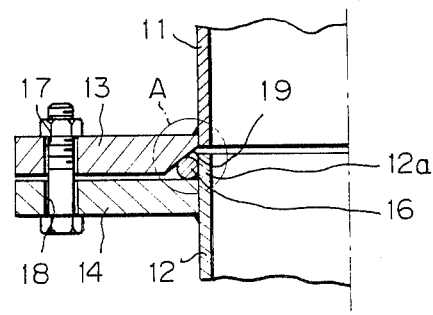
FIG. 2 is a sectional view of a joint means according to a first embodiment of the present invention.
Figure 3:
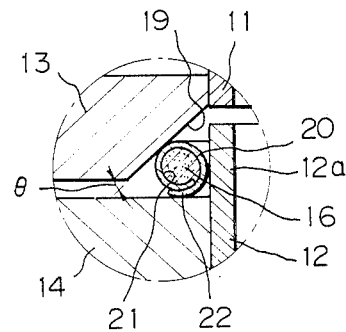
FIG. 3 is an enlarged view of a part indicated by the reference symbol A in FIG. 2.

FIGS. 2 and 3 show in combination a joint means according to a first embodiment of the present invention. In this embodiment, as shown in FIG. 2, first and second flanges 13 and 14 are rigidly secured to the respective outer peripheral surfaces of the end portions of first and second pipes 11 and 12 in a manner similar to that employed in the above-described conventional joint means.

The first and second flanges 13 and 14 are disposed so that circular bores 17 and 18 which are respectively provided therein are aligned with each other and, in this state, they are connected together by means of nuts and bolts. Thus, the first and second pipes 11 and 12 are connected together and maintained in a hermetically sealed state by means of a sealing member 16 which is clamped between the first and second flanges 13 and 14.

Figure 4:
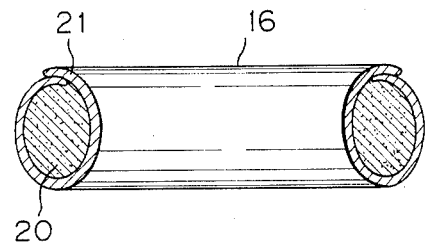
FIG. 4 shows a part of a sealing member employed in the present invention.

In the joint means having flanges according to the present invention, the end portion 12a of the second pipe 12 projects slightly from the second flange 14 secured to the outer peripheral surface of the pipe 12. A loop-shaped sealing member 16 is fitted on this end portion 12a. The sealing member 16 has a closed loop shape formed by wrapping a thin metal sheet 21, such as a stainless steel sheet, around heat resistant material 20, as partially shown in FIG. 4. In the illustrated embodiment, the heat resistant material 20 is expanded graphite. This material is not only heat-resistant but is also elastically deformable and therefore suitable for being used as a constituent element of a sealing member. A sealing member formed by wrapping expanded graphite is known per se and does not constitute any part of the feature of the present invention.

The sealing member 16 has an inner diameter which is equal to or slightly greater (e.g., about 0.5 mm at maximum) than the outer diameter of the second pipe 12 so that the sealing member 16 is readily fitted on the end portion 12a of the second pipe 12 and, at the same time, an excessively large gap is not produced between the outer peripheral surface of the end portion 12a and the inner peripheral surface of the sealing member 16. One end edge portion of the thin metal sheet 21 which wrapped around the heat resistant material 20 is arranged to overlap the other to define an overlapping portion 22 (see FIG. 3), and when the sealing member 16 is fitted on the end portion 12a of the second pipe 12, the overlapping portion 22 is disposed facing the second flange 14, as shown in FIG. 3.

The first flange 13 which is rigidly secured to the end portion of the first pipe 11 has a portion which projects from the end edge of a pipe 11. A frusto-conical surface 19 which is aligned with the sealing member 16 comprises the inner peripheral edge of the first flange 13 on the side thereof which faces the second flange 14. The angle $\theta$ of inclination of the tapered surface 19 is within a range of from 30° to 60°, preferably from 45° to 60°.

Bolts extend through the circular bores 17 and 18 which are respectively provided in the first and second flanges 13 and 14 that are rigidly secured to the end portions of the first and second pipes 11 and 12, and nuts (not shown) are screwed onto these bolts and tightened. Consequently, the sealing member 16 which is fitted on the end portion 12a of the second pipe 12 is urged rightward as viewed in FIGS. 2 and 3 by the frusto-conical surface 19 of the first flange 13 and is thereby pressed against the second flange 14 and, at the same time, the outer diameter of the sealing member 16 is elastically reduced, thus causing the inner peripheral surface of the sealing member 16 to be brought into intimate contact with the outer peripheral surface of the end portion 12a of the second pipe 12.

As this time, the overlapping portion 22 of the thin metal sheet 21 constituting part of the sealing member 16 is pressed against the second flange 14 substantially normally and no force is applied to the overlapping portion 22 from any other direction. There is therefore no risk of the overlapping portion 22 opening to let the heat resistant material 20 come out. Accordingly, the employment of expanded graphite as a heat resistant material according to the present invention does not include a risk of the material escaping and being burnt.

Figure 5:
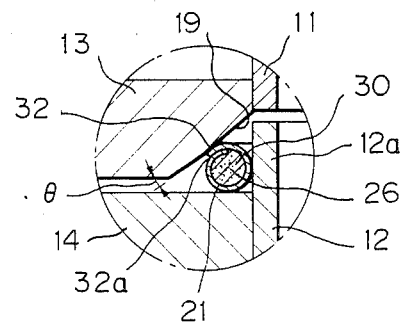
FIG. 5 is a fragmentary sectional view corresponding to FIG. 3, which shows a joint means according to a second embodiment of the present invention.

FIG. 5 is a fragmentary view corresponding to FIG. 3, which shows a part of a second embodiment of the present invention. This embodiment differs from the first embodiment only in the arrangement of the sealing member 26. In the second embodiment, the sealing member 26 is fitted on the end portion 12a of the second pipe 12 with the overlapping portion 32, defined by the overlapping end edge portions of the thin metal sheet 21 wrapped around the heat resistant material 30, facing the tapered surface 19 of the first flange 13. In this case, the end edge portions of the thin metal sheet 21 overlap in such a manner that the seam 32a which extends on the outside of the overlapping portion 32 faces the flange 14.

In the second embodiment, when the flanges 13 and 14 are fastened to each other by means of nuts and bolts which extend through the circular bores 17 and 18, the end edge portions of the thin metal sheet 21 of the sealing member 26 are strongly pressed against each other as well as being deformed in such a manner that the overlapping area is enlarged, i.e. the substantially circular cross section of the sealing member 26 is reduced. Accordingly, there is less of a possibility that the overlapping portion 32 will open to let the heat resistant material 30 come out.

Figure 6:
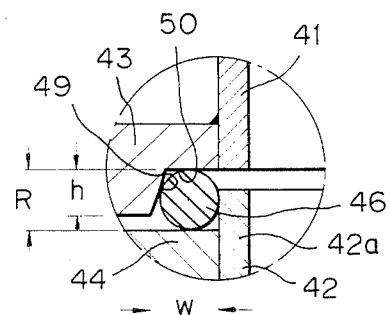
FIG. 6 is a fragementary sectional view corresponding to FIG. 3, which shows a joint means according to a third embodiment of the present invention.

FIG. 6 is a fragmentary view corresponding to FIG. 3, which shows a part of a third embodiment of the present invention. In this embodiment, the end portion 42a of the second pipe 42 projects from the second flange 44 by an amount which is less than that in the first and second embodiments. However, the amount by which the end portion 42a projects is greater than half the diameter of the sealing member 46. The sealing member 46 is arranged the same arrangement as those in the other embodiments and is schematically illustrated in FIG. 6 by a simple circular cross section. The first flange 43 which is rigidly secured to the first pipe 41 differs from the flanges 13 in the other embodiments in that a surface 50 which is parallel to the surface of the flange 44 is provided at the inner side of the frusto-conical surface 49. The height h of the tapered surface 49 is smaller than the outer diameter R of the sealing member 46 but larger than half the diameter R, i.e. $R > h > R/2$. The width w of a sealing member receiving opening which is defined by the lower edge of the tapered surface 49 is set to be slightly larger than the width of the sealing member 46 in its free state so that the sealing member 46 is readily received in the opening.

Bolts (not shown) extend through circular bores which are respectively provided in the first and second flanges 43 and 44 in the same way as in the other embodiments, and nuts (not shown) are screwed onto the bolt and tightened. Consequently, the sealing member 46 which is fitted on the end portion 42a of the second pipe 42 is elastically compressed within the space surrounded by the frusto-conical surface 49, parallel surface 50 of the first flange 43, the end portion 42a of the second pipe 42 and the second flange 44, and the width of the sealing member 46 is thus increased, so that the outer surface of the sealing member 46 is brought into intimate contact with the surface 49 and parallel surface 50 of the first flange 43, the outer peripheral surface of the end portion 42a of the second pipe 42 and the second flange 44.

Accordingly, when exhaust gas flowing through the first and second pipes 41 and 42 leaks to the outside, the gas must pass through two sealed areas to reach the atmosphere no matter which side of the sealing member 46 the gas passes.

The sealing member 46 may have a circular crosssectional configuration. If it has an oval cross section with the major axis extending in the direction in which the sealing member 46 is compressed (i.e., the vertical direction as viewed in FIG. 4), there is an increase in the degree in which the width of the sealing member 46 enlarges when compressed, so that it is possible to increase the contact pressure between the outer peripheral surface of the sealing member 46 and the frusto-conical surface 49 and that between the inner peripheral surface of the sealing member 46 and the outer peripheral surface of the end portion 42a of the second pipe 42. Thus, it is possible to improve the sealing performance of the joint means.

In the embodiment shown in FIG. 6, the angle of inclination of the surface 49 with respect to the central axis of the two pipes 41 and 42 is 45° or less (preferably from 10° to 20°).

We claim:

1. A joint means for fixedly connecting first and second pipes end to end and for sealing the connection of the first and second pipes, said joint means comprising:
    a first flange integrally extending from the outer peripheral surface of the first pipe at an end portion thereof that includes the free end of the first pipe, a part of said first flange projecting from said free end of the first pipe, said part of said first flange having an inner peripheral surface comprising a frusto-conical surface;
    a second flange integrally extending from the outer peripheral surface of the second pipe adjacent an end portion thereof that includes the free end of the second pipe,
    said first flange including said frusto-conical surface and said second flange opposing each other;
    nut and bolt means extending between said first and said second flanges for fixedly securing said first and said second flanges to one another to connect the first pipe to the second pipe; and
    a sealing member clamped between said first and said second flanges for sealing the connection of the first pipe to the second pipe,
    said sealing member having a closed loop shape and comprising heat resistant material surrounded by a thin metal sheet, the thin metal sheet having overlapped end portions one of which includes an edge of the thin metal sheet that is exposed at the periphery of the sealing member thereby defining a seam of the sealing member,
    said sealing member extending around said end portion of the second pipe, and said sealing member in contact with and clamped between said frusto-conical surface of the first flange and said second flange.

2. A joint means as claimed in claim 1,
    wherein said sealing member is clamped between said frusto-conical surface of the first flange and the second flange in a manner in which said frusto-conical surface and said second flange exert a resultant force on said thin sheet that tends to urge said seam in a direction around said heat resistant material, the overlapped portions of the metal sheet disposed in a position relative to said frusto-conical surface at which said direction is one in which the overlapped portions would be increased if the seam was moved in said direction around said heat resistant material.

3. A joint means as claimed in claim 1,
    wherein the inner peripheral surface of said first flange includes a parallel surface extending parallel to the second flange and from which said conical surface extends, said sealing member contacting both said conical surface and said parallel surface.

4. A joint means as claimed in claim 2,
    wherein said seam faces said frusto-conical surface.

* * * * *